(12) United States Patent
Yi et al.

(10) Patent No.: US 9,741,977 B2
(45) Date of Patent: Aug. 22, 2017

(54) RECHARGEABLE BATTERY

(71) Applicant: SAMSUNG SDI CO., LTD., Yongin-si, Gyeonggi-do (KR)

(72) Inventors: Jeong-Doo Yi, Yongin-si (KR); Jun-Won Suh, Yongin-si (KR); Ju-Hee Sohn, Yongin-si (KR); Hyun-Hwa Song, Yongin-si (KR); Ju-Hyeong Han, Yongin-si (KR); Seok-Hun Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 165 days.

(21) Appl. No.: 14/827,233

(22) Filed: Aug. 14, 2015

(65) Prior Publication Data

US 2016/0155997 A1    Jun. 2, 2016

(30) Foreign Application Priority Data

Nov. 27, 2014   (KR) .................. 10-2014-0167615

(51) Int. Cl.
*H01M 2/02*   (2006.01)
*H01M 2/08*   (2006.01)
*H01M 10/04*  (2006.01)

(52) U.S. Cl.
CPC ......... *H01M 2/0275* (2013.01); *H01M 2/021* (2013.01); *H01M 2/08* (2013.01); *H01M 10/0436* (2013.01); *H01M 2220/30* (2013.01)

(58) Field of Classification Search
CPC ............................... H01M 2/21; H01M 2/0275
See application file for complete search history.

(56) References Cited

U.S. PATENT DOCUMENTS

| | | | |
|---|---|---|---|
| 6,599,659 B1 * | 7/2003 | Endo ................. | H01M 2/021 29/623.2 |
| 2004/0234848 A1 * | 11/2004 | Chung ................. | H01M 2/021 429/181 |
| 2012/0040235 A1 | 2/2012 | Cho et al. | |

(Continued)

FOREIGN PATENT DOCUMENTS

| JP | 2001-84970 A | 3/2001 |
|---|---|---|
| JP | 4591656 B2 | 9/2010 |
| KR | 10-2012-0013883 A | 2/2012 |

OTHER PUBLICATIONS

Full English Translation for JP 2001-84970 A, 12 pages.
Full English Translation for laid open JP 2005-174680 A, 9 pages.

*Primary Examiner* — Matthew Merkling
(74) *Attorney, Agent, or Firm* — Lewis Roca Rothgerber Christie LLP

(57) ABSTRACT

A rechargeable battery includes: an electrode assembly including first electrodes; separators; and second electrodes, wherein the first electrodes, separators, and second electrodes are laminated together and are fixed by a fixing portion at one side; a case, which is flexible, accommodating the electrode assembly, and pressure-adjusted after sealing; a marginal region between a free end of the electrode assembly and an inside surface of the case; and a spacing portion at the marginal region midway along the case, the spacing portion having a space that is narrower than a case thickness, the spacing portion accommodating changes in a length of the free end of the electrode assembly.

12 Claims, 10 Drawing Sheets

(56) References Cited

U.S. PATENT DOCUMENTS

2013/0288104 A1* 10/2013 Kang ................... H01M 2/021
 429/153
2016/0149171 A1* 5/2016 Suh ...................... H01M 2/021
 429/163
2016/0268580 A1* 9/2016 Yi ........................... H01M 2/26

* cited by examiner

RECHARGEABLE BATTERY

CROSS-REFERENCE TO RELATED APPLICATION

This application claims priority to and the benefit of Korean Patent Application No. 10-2014-0167615 filed in the Korean Intellectual Property Office on Nov. 27, 2014, the entire contents of which are incorporated herein by reference.

BACKGROUND

1. Field

This document relates to a flexible rechargeable battery.

2. Description of the Related Art

With the development of mobile technology, the demand for rechargeable batteries as a source of energy is increasing. Rechargeable batteries are batteries that are designed to be charged and discharged repeatedly, unlike primary batteries.

One of the important factors in the manufacture of rechargeable batteries is energy density. Rechargeable batteries used in small electronics are inserted into an electronic device and used as a power supply.

In small electronics, the volume or capacity and form factor of the power supply are set because the size of the electronic device is restricted and determined in advance in terms of design. With the trend toward information devices having a smaller size, power supply sizes are also getting smaller in size.

In addition, consumers are demanding higher capacity as rechargeable batteries now have longer use time and have become smaller in size. That is, volumetric energy density needs to be increased. Accordingly, there is a demand for rechargeable batteries which have less unnecessary space and are compact.

For example, a pouch-type rechargeable battery includes an electrode assembly that is formed by laminating positive electrodes, separators, and negative electrodes to perform charging and discharging, a pouch that accommodates the electrode assembly, and electrode tabs that enable the electrode assembly to be pulled out of the pouch.

In the pouch-type rechargeable battery, the empty space between the electrode assembly and the pouch is made as small as possible, just large enough to allow an electrolyte solution into that space, and the overall volume of the battery is reduced or minimized by applying vacuum to the inside.

When the rechargeable battery is flexible, however, the electrode assembly slips inside the pouch; therefore, space is needed inside the pouch for flexible bending, even if it means the battery's energy density will be decreased.

Moreover, the vacuum process, to be conducted after injection of the electrolyte solution into the pouch, will reduce or minimize the overall volume of the rechargeable battery while decreasing the internal pressure. The pouch-type rechargeable battery that underwent the vacuum process will cause the positive electrodes, separators, and negative electrodes to slip less.

The above information disclosed in this Background section is only for enhancement of understanding of the background of the invention and therefore it may contain information that does not form prior art.

SUMMARY

Embodiments of the present invention have been made in an effort to provide a rechargeable battery which has flexibility to accommodate changes in the length of a laminate electrode assembly caused by slipping within a pouch, when bending stress acts on the electrode assembly, and improves the durability of the pouch.

An exemplary embodiment of the present invention provides a rechargeable battery including: an electrode assembly including: first electrodes; separators; and second electrodes, wherein the first electrodes, separators, and second electrodes are laminated together and are fixed by a fixing portion at one side; a case, which is flexible, accommodating the electrode assembly and pressure-adjusted after sealing; a marginal region between a free end of the electrode assembly and an inside surface of the case; and a spacing portion at the marginal region midway along the case, the spacing portion having a space that is narrower than a case thickness, the spacing portion accommodating changes in a length of the free end of the electrode assembly.

The rechargeable battery may further include a first electrode tab connected to the first electrodes protruding from one edge of the case and a second electrode tab connected to the second electrodes and protruding from one edge of the case, wherein the first electrode tab and the second electrode tab have a tab gap therebetween, and wherein the spacing portion may be at the marginal region at the side of the electrode assembly 110 that is opposite to the one edge.

Uncoated regions of the first and second electrodes may be alternately arranged at respective sides to correspond to the first electrode tab and the second electrode tab.

The fixing portion may include an adhesive that attaches at least one coated region adjacent to the uncoated region of at least one of the first electrodes, at least one of the separator, and at least one coated region adjacent to the uncoated region of at least one of the second electrodes.

The spacing portion may be at a side of the electrode assembly 110 that is opposite to the side having the fixing portion.

A space of the spacing portion may be wider than 1/4 of the case thickness and narrower than the case thickness.

The case may include: a first covering portion located at a first side of the electrode assembly and a second covering portion located at a second side opposite to the first side of the electrode assembly, the first and second covering portions may define the spacing portion; and a gasket sealing a gap between the first and second covering portions, allowing the first and second electrode tabs to protrude, and defining one side of the marginal region.

A first curved surface may protrude from the first covering portion toward the second covering portion; and a second curved surface may protrude from the second covering portion toward the first curved surface.

The gasket may include: a first curved groove corresponding to the first curved surface of the first covering portion; and a second curved groove corresponding to the second curved surface of the second covering portion.

The first covering portion may have a flat surface; and the second covering portion may have a curved surface protruding toward the flat surface.

The space of the spacing portion may be minimized at a location that is at half a length of the marginal region.

The space of the spacing portion may be set to 1/4 of the case thickness at a location that is at half a length of the marginal region.

According to an embodiment of the present invention, a marginal region and a spacing portion are provided between an electrode assembly and a case by laminating first electrodes, separators, and second electrodes, fixing the first electrodes, the separators, and the second electrodes with a fixing portion on one side, and adjusting the pressure of the case after sealing to accommodate changes in the length of a laminate electrode assembly caused by slipping when bent.

That is, when bending stress acts on a rechargeable battery whose vacuum pressure is adjusted to be lower than the vacuum pressure for sealing, the first electrodes, the separators, and the second electrodes may slip easily under low-vacuum pressure and undergo length changes, thereby making the rechargeable battery bend more easily. The marginal region and the spacing portion may accommodate increases in the length of the electrode assembly.

Accordingly, the rechargeable battery can have flexibility, because of the low-vacuum pressure within the case, when the rechargeable battery is bent under a bending stress. With this flexibility, a less bending stress will be required to bend the rechargeable battery the same or substantially the same way. That is, the durability of the pouch can be improved due to the use of less bending stress.

DETAILED DESCRIPTION

Figure 1:
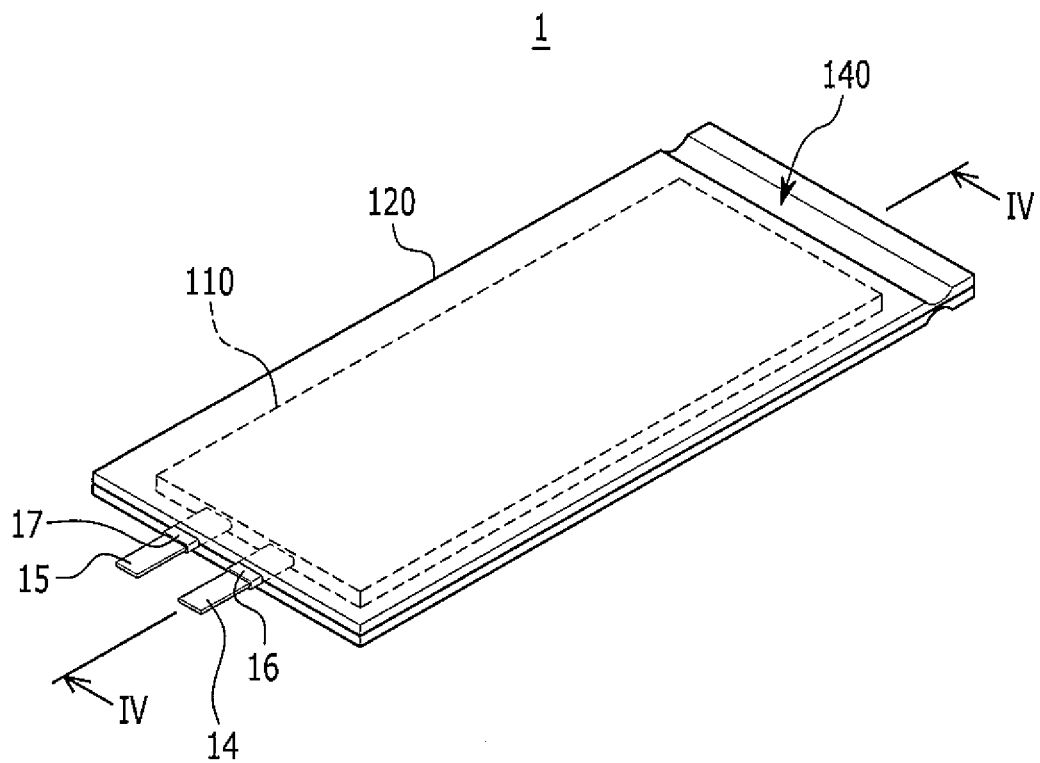
FIG. 1 is a perspective view of a rechargeable battery according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

It will be understood that, although the terms "first", "second", "third", etc., may be used herein to describe various elements, components, regions, layers, and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section, without departing from the spirit and scope of the present invention.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

The use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. In contrast, when an element or layer is referred to as being "directly on," "directly connected to," "directly coupled to," "directly connected with," "directly coupled with," or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. §112, first paragraph, and 35 U.S.C. §132(a).

The rechargeable battery and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the rechargeable battery may be formed on one integrated circuit (IC) chip or on separate IC chips. Further, the various components of the rechargeable battery may be implemented on a flexible printed circuit film, a tape carrier package (TCP), a printed circuit board (PCB), or formed on a substrate.

Figure 2:
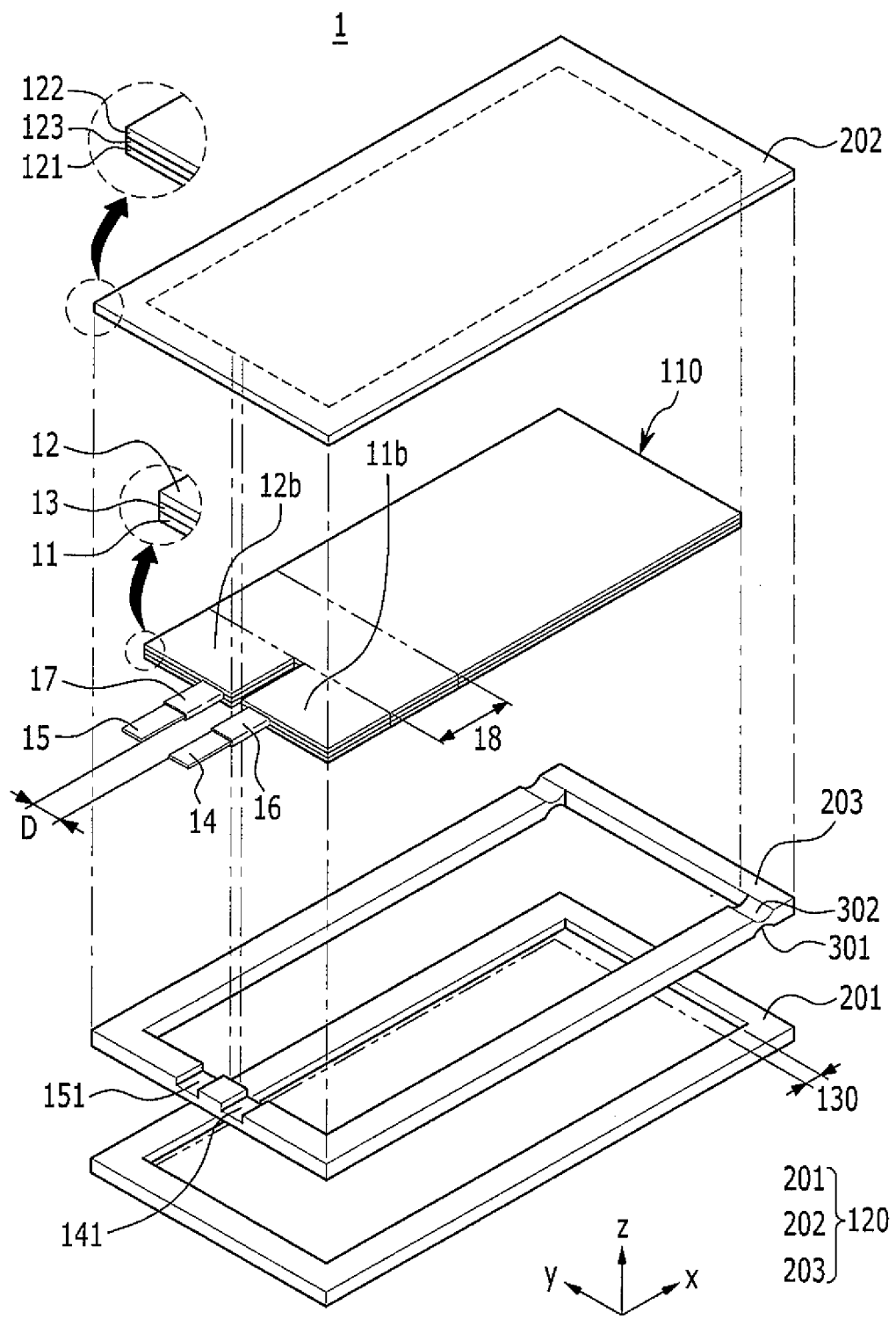
FIG. 2 is an exploded perspective view of the rechargeable battery of FIG. 1.

FIG. 1 is a perspective view of a rechargeable battery according to a first exemplary embodiment of the present invention, and FIG. 2 is an exploded perspective view of the rechargeable battery of FIG. 1. Referring to FIG. 1 and FIG. 2, the rechargeable battery 1 of the first exemplary embodiment includes an electrode assembly 110 that is charged or discharged with current, a case (hereinafter, referred to as 'pouch 120') that stores the electrode assembly 110 and is flexible, a marginal region 130 defined between the electrode assembly 110 and the inside surface of the pouch 120, and a spacing portion 140 that is provided in the marginal region 130 and accommodates changes in the length of the electrode assembly 110 when it bends.

Figure 3:
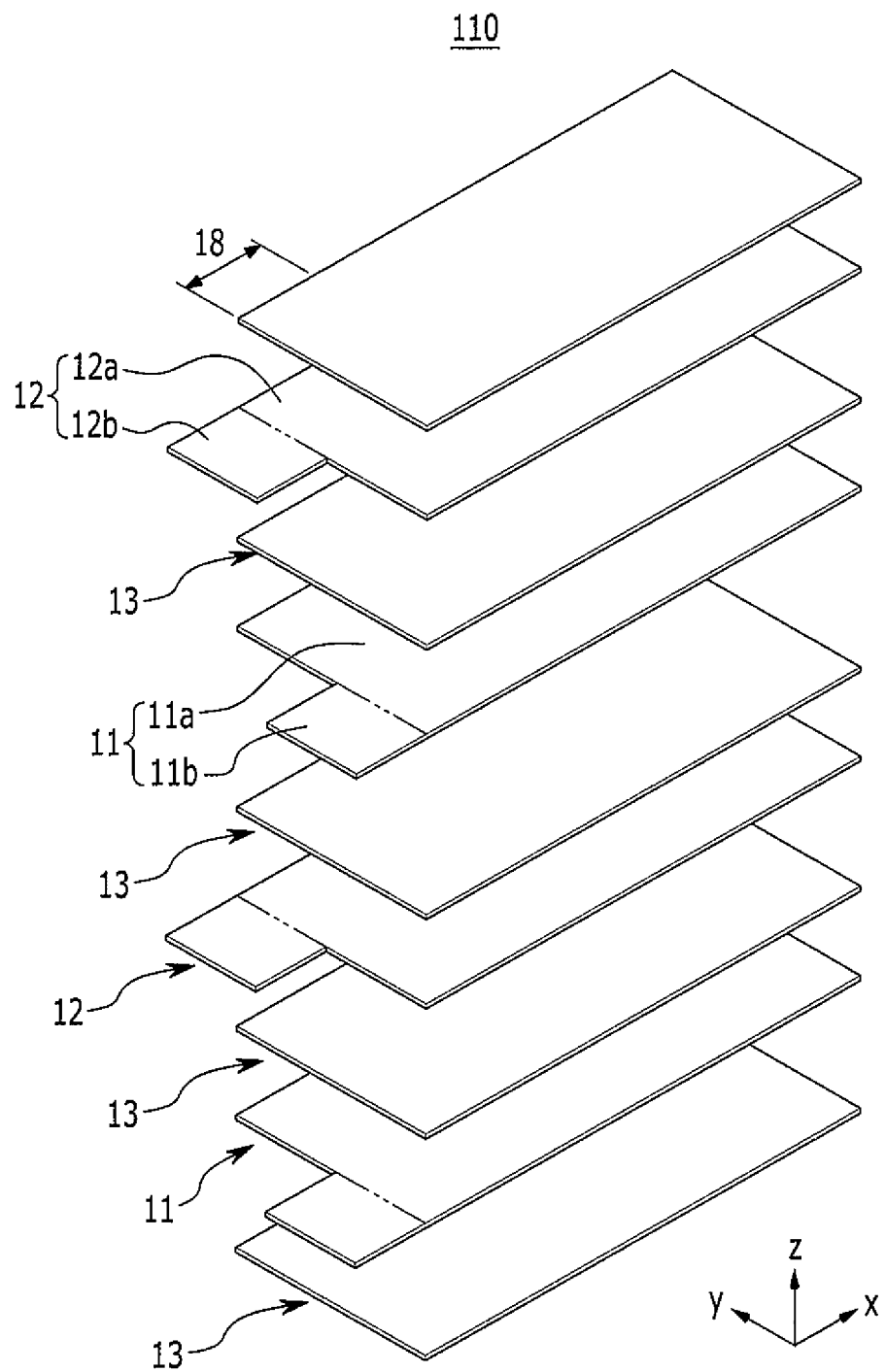
FIG. 3 is an exploded perspective view of the electrode assembly of FIG. 2.

FIG. 3 is an exploded perspective view of the electrode assembly of FIG. 2. Referring to FIG. 2 and FIG. 3, the electrode assembly 110 is a lamination-type electrode assembly which is formed by laminating first electrodes 11 and second electrodes 12, with separators 13 interposed between the first and second electrodes 11 and 12. The separators 13 may be made of a polymer film that allows lithium ions to pass through.

The electrode assembly 110 further includes a first electrode tab 14 and a second electrode tab 15 connected to the first electrodes 11 and the second electrodes 12, respectively. The first and second electrode tabs 14 and 15 are pulled out from one edge of the pouch 120 to form a tab gap G between them.

The first and second electrodes 11 and 12 and the separators 13 are fixed by a fixing portion 18 formed on one side of the electrode assembly 110. The first and second electrodes 11 and 12 and the separators 13 diverge from each other at the side of the electrode assembly 110 that is opposite to the side having the fixing portion 18 and have free ends (e.g., ends not fixed by a fixing portion).

That is, the first and second electrodes 11 and 12 and the separators 13 are laminated and can slip (or slide) against one another except at the fixing portion 18.

The first electrodes 11 each include a coated region 11a where an active material is coated on a current collector made of thin metal foil, and an uncoated region 11b which serves as a current collector that is exposed because no active material is coated on it. For example, the current collectors of the first electrodes 11 and the first electrode tab 14 may be made of aluminum (Al).

The second electrodes 12 each include a coated region 12a where a different active material from that of the first electrode 11 is coated on a current collector made of a thin metal sheet, and an uncoated region 12b which serves as a current collector that is exposed because no active material is coated on it. For example, the current collectors of the second electrodes 12 and the second electrode tab 15 may be made of copper (Cu).

The uncoated regions 11b and 12b of the laminated first and second electrodes 11 and 12 are alternately arranged on two sides along the width (y-axis). That is, in FIG. 3, the uncoated regions 11b of the first electrodes 11 are arranged on the right side, and the uncoated regions 12b of the second electrodes 12b are arranged on the left side.

Figure 4:
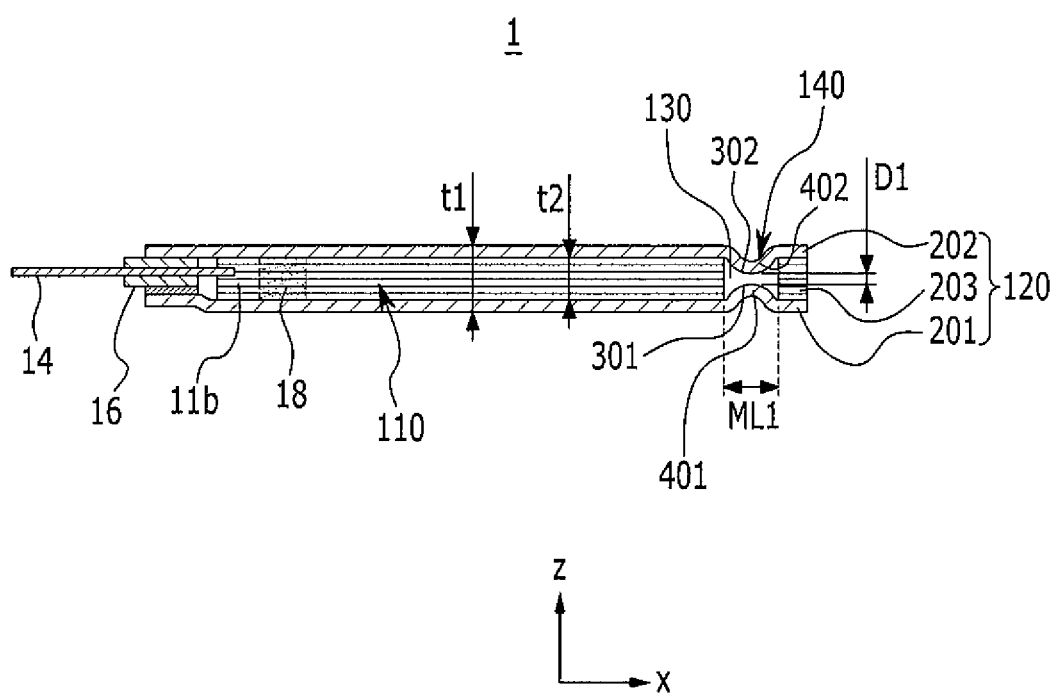
FIG. 4 is a cross-sectional view taken along the line IV-IV of FIG. 1.

FIG. 4 is a cross-sectional view taken along the line IV-IV of FIG. 1. Referring to FIG. 2 to FIG. 4, the fixing portion 18 is formed in such a way that a coated region 11a adjacent to the uncoated region 11b of a first electrode 11, a separator 13, and a coated region 12a adjacent to the uncoated region 12b of a second electrode 12 are attached with an adhesive.

In an example, an adhesive is applied on a separator 13 corresponding to a coated region 11a adjacent to the uncoated region 11b of a first electrode 11 to attach the coated region 11a of the first electrode 11 to the separator 13, and then the adhesive is applied on the coated region 11a adjacent to the uncoated region 11b to attach another separator 13 to the coated region 11a, thereby attaching the two separators 13 and the first electrode 11.

Similarly, the adhesive is applied on a separator 13 corresponding to a coated region 12a adjacent to the uncoated region 12b of a second electrode 12 to attach the coated region 12a of the second electrode 12 to the separator 13, and then the adhesive is applied on the coated region 12a adjacent to the uncoated region 12b to attach another separator 13 to the coated region 12a, thereby attaching the two separators 13 and the second electrode 12.

As the process of attaching a separator 13 to a first electrode, then a second electrode to the separator 13, and then another separator 13 to the second electrode 12 is repeated, the fixing portion 18 may be formed on the electrode assembly 110.

Referring to FIG. 4, the marginal region 130 and the spacing portion 140 are at the side of the electrode assembly 110 that is opposite to the side having the fixing portion 18. That is, the marginal region 130 is provided at the side of the electrode assembly 110 that is opposite to the side having the fixing portion 18 along the length (x-axis) of the rechargeable battery 1 and the electrode assembly 110 and the marginal region 130 has a length ML1.

The spacing portion 140 is defined in the marginal region 130 midway through the pouch 120, with a space D1 which is narrower than a cell thickness (or case thickness) t1. The spacing portion 140 and the marginal region 130 accommodate changes in the length of the electrode assembly 110 when it bends. The electrode assembly 110 has a thickness t2 which is less than the cell thickness t1, so it may slip (or slide) on the inside surface of the pouch 120 when bent.

In the present exemplary embodiment, the fixing portion 18 is formed at the side of the electrode assembly 110 that is opposite to the side having the marginal region 130 because it is provided in the coated regions 11a and 12a adjacent to the uncoated regions 11b and 12b. Although not shown, the fixing portion may be formed midway along the length (x-axis) of the electrode assembly. The fixing portion, when provided in the coated regions adjacent to the uncoated regions, enables the electrode assembly to bend well under a bending stress.

As the distance between the fixing portion of the electrode assembly and the marginal region becomes shorter, the possible range of changes in the length of the electrode assembly decreases. Nevertheless, the fixing portion provided in the coated regions adjacent to the uncoated regions helps minimize the narrowing of the range of changes in length.

That is, when bending stress acts on the rechargeable battery 1, the pouch 120 and the electrode assembly 110 are bent. Hereupon, the first and second electrodes 11 and 12 and the separators 13 will slip (or slide) while still being fixed at the fixing portion 18, causing an increase or decrease in length on their free ends. Also, the electrode assembly 110 slips (or slides) on the inside surface of the pouch. Accordingly, the electrode assembly 110 and the rechargeable battery 1 can bend properly.

Referring again to FIG. 1 and FIG. 2, the first electrode tab 14 is connected to the uncoated regions 11b of the first electrodes 11, and the second electrode tab 15 is connected to the uncoated regions 12b of the second electrodes 12. The first and second electrode tabs 14 and 15 may be connected to the uncoated regions 11b and 12b by welding.

The pouch 120 accommodates the electrode assembly 110 with flexibility, and its outer periphery is heat-sealed to form the rechargeable battery 1. In an example, the pouch 120 includes a first covering portion 201 and a second covering portion 202 which are located at opposite sides of the electrode assembly 110 and a gasket 203.

The gasket 203 seals the outer peripheries of the first and second covering portions 201 and 202, and allows the first and second electrode tabs 14 and 15 to be pulled out of the pouch 120. The gasket 203 may have fixing grooves 141 and 151 for fixing the first and second electrode tabs 14 and 15. In this instance, the first and second electrode tabs 14 and 15, are coated with insulating members 16 and 17 and fixed to the fixing grooves 141 and 151, and are pulled out from the pouch 120 through the sealed portions.

That is, the gasket 203 improves the fixing of the first and second electrode tabs 14 and 15 and the sealing performance of the first and second covering portions 201 and 202. The insulating members 16 and 17 electrically insulate the first and second electrode tabs 14 and 15 from each other, and electrically insulate the first and second electrode tabs 14 and 15 from the pouch 120.

Referring again to FIG. 2 and FIG. 4, the spacing portion 140 is formed of a first curved surface 401 protruding from the first covering portion 201 toward the second covering portion 202 and a second curved surface 402 protruding from the second covering portion 202 toward the first curved surface 401.

The gasket 203 includes a first curved groove 301 corresponding to the first curved surface 401 of the first covering portion 201 and a second curved groove 302 corresponding to the second curved surface 402 of the second covering portion 202.

By sealing the pouch 120, the first and second covering portions 201 and 202 are sealed with the gasket 203 interposed between them, and the first and second curved surfaces 401 and 402 of the first and second covering portions 201 and 202 are sealed to the first and second curved grooves 301 and 302, respectively. Accordingly, the pouch 120 defines the spacing portion 140 in the marginal region 130.

After the pouch 120 is sealed, the internal pressure of the rechargeable battery 1 is adjusted. That is, the vacuum pressure is reduced from high vacuum to low vacuum after sealing the pouch 120. Accordingly, the spacing portion 140 has a space D1 in the marginal region 130, and the first and second electrodes 11 and 12 and the separators 13 may slip (or slide) properly in the electrode assembly 110.

The pouch 120 defines the marginal region 130 and the spacing portion 140 on a free end of the electrode assembly 110, and is formed of a multi-layer sheet structure covering the exterior of the electrode assembly 110. For example, the pouch 120 may include an inner sheet 121, an outer sheet 122, and a metal sheet 123.

The inner sheet 121 forms the inside surface of the pouch 120, provides insulation and heat sealing, and is made of a polymer sheet. The outer sheet 122 forms the outside surface of the pouch 120, provides protection, and is made of a PET (polyethyleneterephthalate) sheet, nylon sheet, or PET-nylon composite sheet.

The metal sheet 123 is provided between the inner and outer surfaces 121 and 122 to provide the pouch 120 with mechanical strength. For example, the metal sheet 123 may be made of an aluminum sheet.

The first and second covering portions 201 and 202 may be made up of an inner sheet 121, an outer sheet 122, and a metal sheet 123 that have the same or substantially the same layer structure. Although not shown, the pouch may be formed of the first and second covering portions sealed together and the pouch may store the electrode assembly, without having the gasket.

For example, the first covering portion 201 may be recessed to accommodate the electrode assembly 110, and the second covering portion 202 may be flattened to cover the electrode assembly 110 accommodated in the first covering portion 201. Although not shown, the second covering portion may be connected to the first covering portion.

Figure 5:
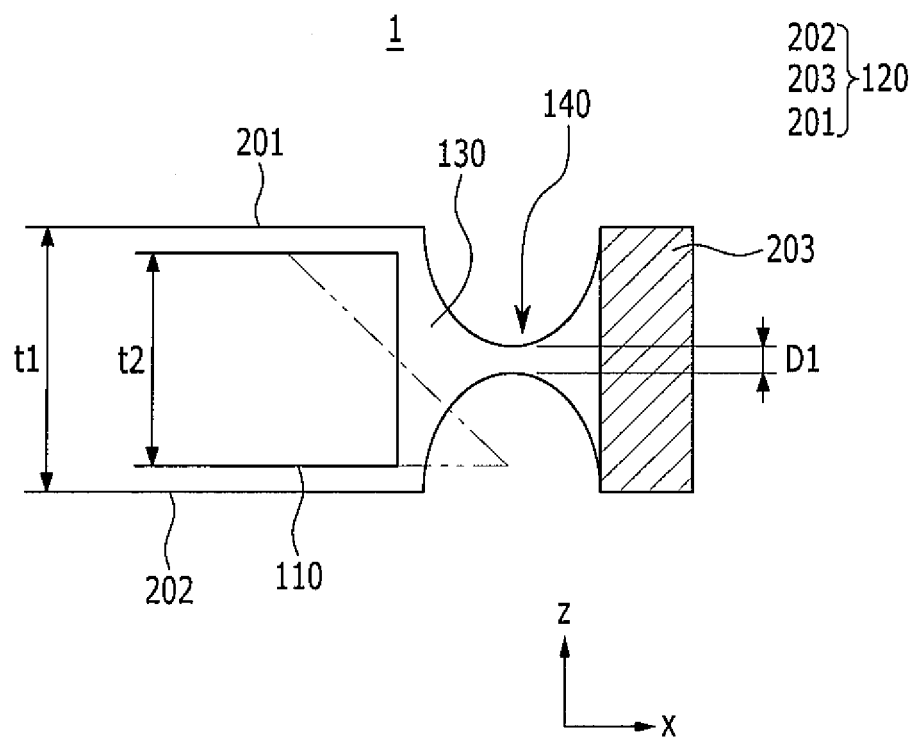
FIG. 5 is a conceptual diagram of the marginal region of FIG. 4.
Figure 6:
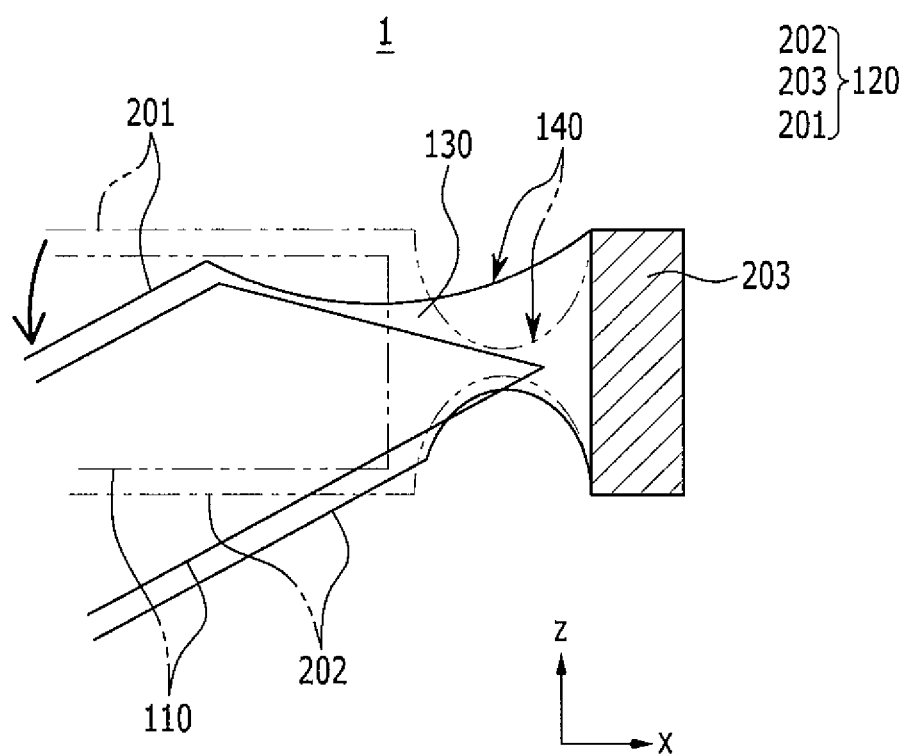
FIG. 6 is a diagram showing the operating state of the marginal region of FIG. 5 before and after bending.

FIG. 5 is a conceptual diagram of the marginal region of FIG. 4, and FIG. 6 is a diagram showing the operating state of the marginal region of FIG. 5 before and after bending. Referring to FIG. 5 and FIG. 6, the rechargeable battery 1 of the first exemplary embodiment has the marginal region 130 and the spacing portion 140 at the side of the electrode assembly 110 that is opposite to the side having the first and second electrode tabs 14 and 15 in order to accommodate changes in the length of the electrode assembly 110 when it bends.

For example, the electrode assembly 110 has a characteristic length, a thickness t2, and an allowable bending radius. The characteristic length indicates the length of the electrode assembly 110, except the fixing portion 18, along the entire length of the x-axis of the electrode assembly 110. That is, the characteristic length indicates the length of the area where the electrode assembly 110 can bend as it slips (or slides) when under a bending stress.

The thickness t2 indicates the thickness of the electrode assembly 110 that is defined in the characteristic length area. That is, the thickness t2 indicates the thickness of the electrode assembly 110 that can bend as it slips (or slides) when the rechargeable battery 1 is under a bending stress. That is, the thickness t2 excludes the thickness of the pouch 120 from the rechargeable battery 1.

For example, the ratio t1/t2 of the cell thickness t1 (including the pouch) to the thickness t2 of the electrode assembly 110 is above 1.0. In a concrete example, the ratio t1/t2 of the cell thickness t1 (including the pouch) to the thickness t2 of the electrode assembly 110 is above 1.0 and below 1.5.

That is, in the rechargeable battery 1, z-axial spacing exists between the inner surfaces of the first and second covering portions 201 and 202 and the electrode assembly 110, thus enabling the electrode assembly 110 to slip (or slide) within the pouch 120.

The rechargeable battery 1 bends at a given angle under a bending stress. The electrode assembly 110 may be fixed at the first and second electrode tabs 14 and 15 by the fixing portion 18, and may have a free end in the marginal region 130 and the spacing portion 140.

That is, the first and second electrodes 11 and 12 and the separators 13 slip (or slide) against one another as they are bent under a bending stress except in the area of the fixing portion 18. Hereupon, the length of the electrode assembly 110 is gradually decreased in the area outside the thickness t2, and the length of the electrode assembly 110 is gradually increased in the area inside the thickness t2 (see the two-dot chain line of FIG. 5 and the solid line of FIG. 6).

In this way, the amount of increase of length of the electrode assembly 110 in the area inside the thickness t2 is moved to the marginal region 130 and inserted into the space D1 of the spacing portion 140. Accordingly, the lengths of the first and second electrodes 11 and 12 and the separators 13 are gradually increased and are increasingly accommodated in the marginal region 130 and the spacing portion 140. That is, the flexibility of the rechargeable battery 1 to bending stress can be achieved, and therefore the durability of the pouch can be improved.

A second exemplary embodiment of the present invention will now be described. The same or substantially the same components as the first exemplary embodiment may be omitted, and the differences between the first and second exemplary embodiments will be described.

Figure 7:
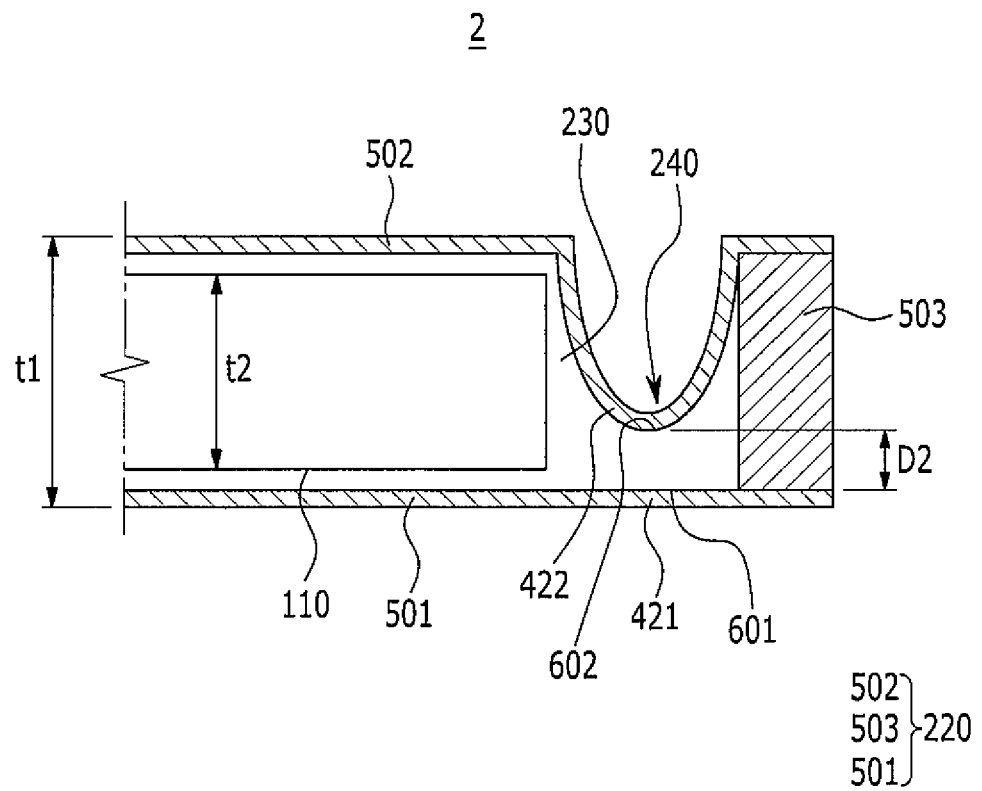
FIG. 7 is a conceptual diagram of the marginal region of a rechargeable battery according to a second exemplary embodiment of the present invention.
Figure 8:
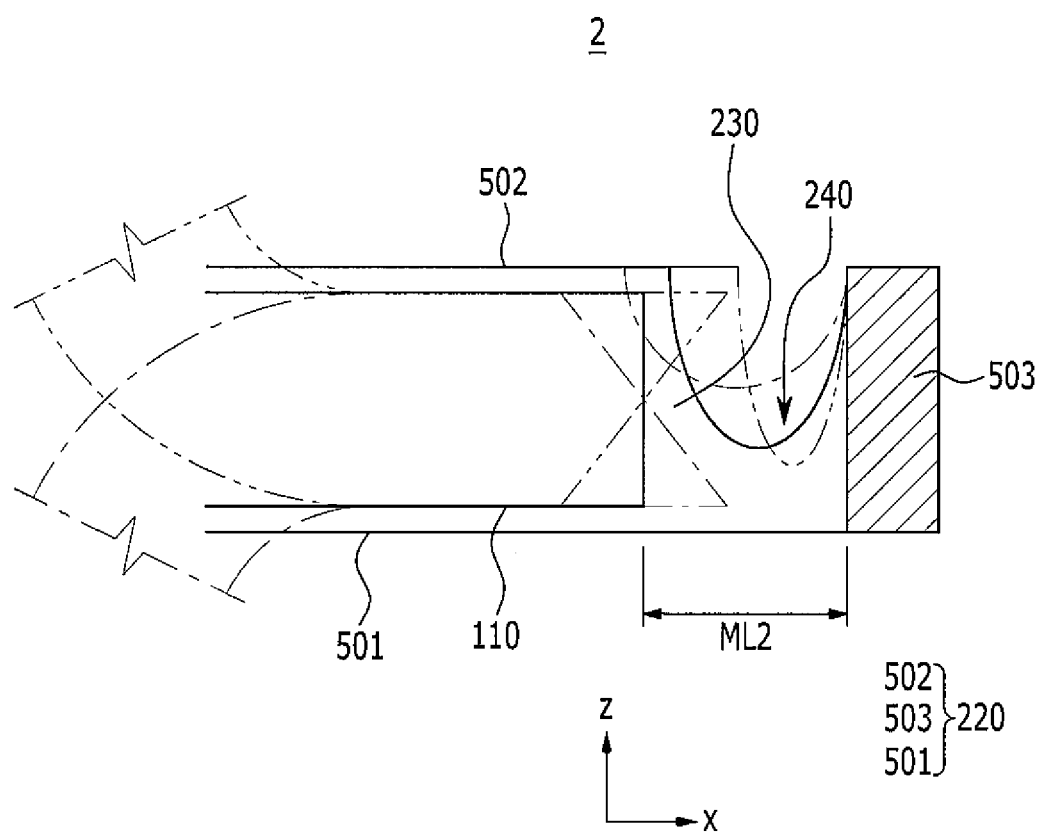
FIG. 8 is a diagram showing the operating state of the marginal region of FIG. 7 before and after bending.

FIG. 7 is a conceptual diagram of the marginal region of a rechargeable battery according to a second exemplary embodiment of the present invention, and FIG. 8 is a diagram showing the operating state of the marginal region of FIG. 7 before and after bending. Referring to FIG. 7 and FIG. 8, in the pouch 220 of the rechargeable battery 2 of the second exemplary embodiment, the spacing portion 240 may be formed of a flat surface 421 on the first covering portion 501 and a curved surface 422 protruding from the second covering portion 502 toward the flat surface 421.

The gasket 503 has a flat surface 601 corresponding to the flat surface 421 of the first covering portion 501 and a curved groove 602 corresponding to the curved surface 422 of the second covering portion 502. By sealing the pouch 220, the first and second covering portions 501 and 502 are sealed with the gasket 503 interposed between them, and the first and second curved surfaces 421 and 422 of the first and second covering portions 501 and 202 are sealed to the flat surface 601 and curved surface 602 of the gasket 503, respectively. Accordingly, the pouch 220 defines the spacing portion 240 in the marginal region 230.

In the rechargeable battery 2 of the second exemplary embodiment, the marginal region 230 and the spacing portion 240 formed closer the first covering portion 501 are provided at the side of the electrode assembly 110 that is opposite to the side having the first and second electrode tabs 14 and 15 to accommodate changes in the length of the electrode assembly when it bends.

Since one side of the spacing portion 240 is formed as a flat surface 421, the rechargeable battery 2 of the second exemplary embodiment can accommodate increases in the length of the electrode assembly 110 caused by slipping (or sliding) when bent with the curved surface 422 facing inward (as indicated by the two-dot chain line of FIG. 8), compared to when bent with the flat surface 421 facing inward (as indicated by the one-dot chain line of FIG. 8).

The space D2 of the spacing portion 240 is made as small as possible (e.g., minimized) at half the length ML2 of the marginal region 230. For example, the space D2 of the spacing portion 240 may be set to 1/4 of the cell thickness t1.

As the space D2 of the spacing portion 240 is defined closer to the flat surface 421, when the rechargeable battery 1 is bent with the flat surface 421 facing inward, the amount of increase in the length of the electrode assembly 110 that can be accommodated by the marginal region 230 and the flat surface 421 of the spacing portion 240 can be increased.

Accordingly, the rechargeable battery 2 of the second exemplary embodiment can be used efficiently when bent only in one direction. On the other hand, the rechargeable battery 1 of the first exemplary embodiment can be used efficiently when bent in two directions.

Figure 9:
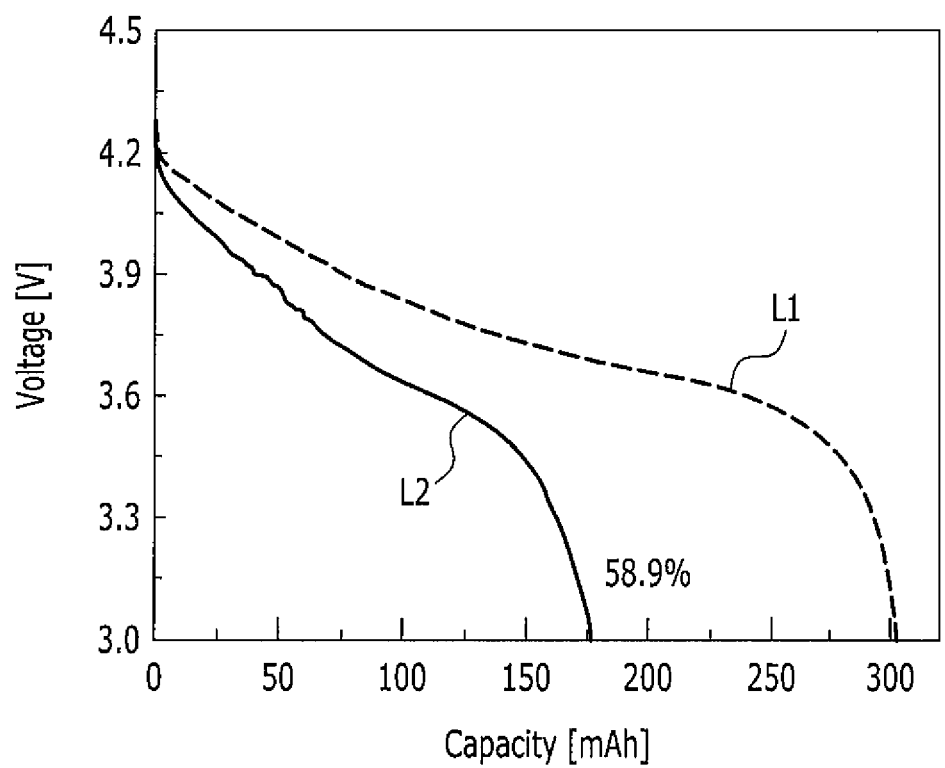
FIG. 9 is a graph of a rechargeable battery bending endurance test according to the conventional art.
Figure 10:
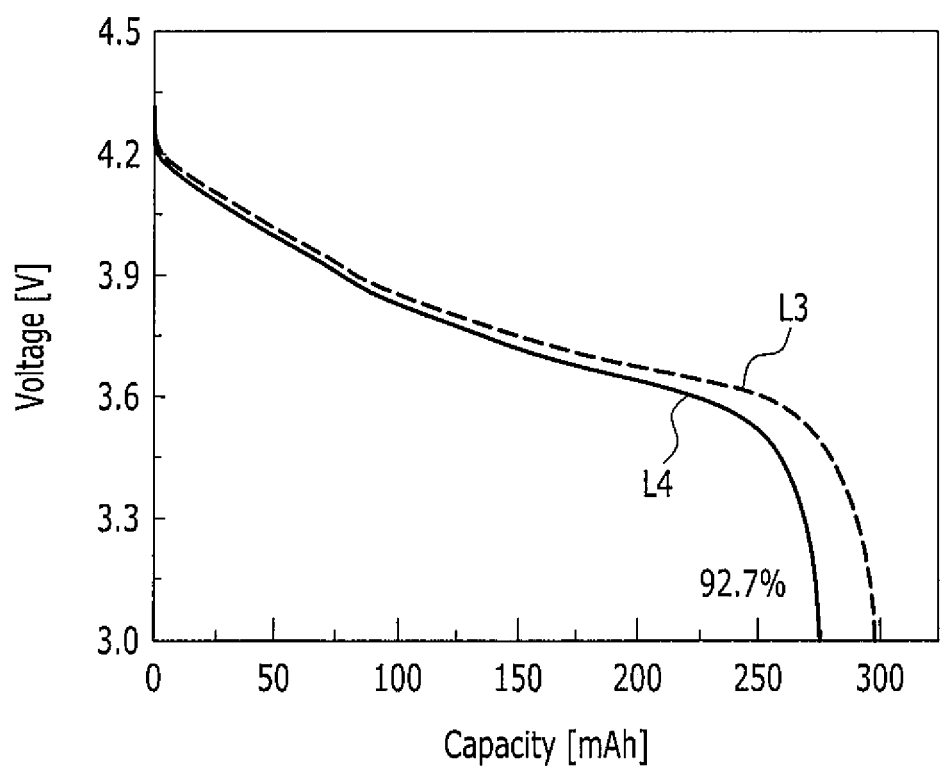
FIG. 10 is a graph of a rechargeable battery bending endurance test according to an exemplary embodiment of the present invention.

FIG. 9 is a graph of a rechargeable battery bending endurance test according to the conventional art, and FIG. 10 is a graph of a rechargeable battery bending endurance test according to an exemplary embodiment of the present invention.

A rechargeable battery according to an exemplary embodiment and a pouch-type rechargeable battery (comparative example) to which the marginal region is not applied were manufactured, bending stress was applied to bend the rechargeable batteries, and degradation in their performance was measured by comparing their capacities before and after bending. A rechargeable battery bending endurance test was conducted with a bending radius R of 25 mm.

The rechargeable battery of comparative example showed a capacity L2 which is 58.9% of the initial capacity L1 when subjected to a 1,000-cycle bending test. In comparison, the rechargeable battery 1 of an exemplary embodiment, it showed a capacity L4 which is 92.7% of the initial capacity after a 20,000-cycle bending test. That is, it was observed that the rechargeable battery 1 of an exemplary embodiment has a capacity performance similar to the initial one even after the 20,000-cycle bending test.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

| Description of some of the symbols | |
|---|---|
| 1, 2: rechargeable battery | 11, 12: first and second electrodes |
| 11a, 12a: coated region | 11b, 12b: uncoated region |
| 13: separator | 14, 15: first and second electrode tabs |
| 18: fixing portion | 110: electrode assembly |
| 120, 220: case (pouch) | 121: inner sheet |
| 122: outer sheet | 123: metal sheet |
| 130, 230: marginal region | 140, 240: spacing portion |
| 141, 151: fixing groove | 201, 501: first covering portion |
| 202, 502: second covering portion | 203, 503: gasket |
| 301, 302: first and second curved grooves | |
| 401, 402: first and second curved surfaces | |
| 421, 601: flat surface | 422: curved surface |
| 602: curved groove | D1, D2: space of spacing portion |
| G: tab gap | ML1, ML2: margin length |
| R: bending radius | t1: cell thickness |
| t2: electrode assembly thickness | |

What is claimed is:
1. A rechargeable battery comprising:
an electrode assembly comprising:
first electrodes;
separators; and
second electrodes,
wherein the first electrodes, the separators, and the second electrodes are laminated together and are fixed by a fixing portion at one side;
a case, which is flexible, accommodating the electrode assembly and pressure-adjusted after sealing;
a marginal region between a free end of the electrode assembly and an inside surface of the case; and a spacing portion at the marginal region midway along the case, the spacing portion having a space that is narrower than a case thickness, the spacing portion being configured to accommodate changes in a length of the free end of the electrode assembly.

2. The rechargeable battery of claim 1, further comprising:
   a first electrode tab connected to the first electrodes protruding from one edge of the case; and
   a second electrode tab connected to the second electrodes protruding from the one edge of the case,
   wherein the first electrode tab and the second electrode tab have a tab gap therebetween, and
   wherein the spacing portion is at the marginal region on a side of the electrode assembly that is opposite to the one edge.

3. The rechargeable battery of claim 2,
   wherein uncoated regions of the first and second electrodes are alternately arranged at respective sides to correspond to the first electrode tab and the second electrode tab.

4. The rechargeable battery of claim 3,
   wherein the fixing portion comprises an adhesive that attaches:
   at least one coated region adjacent to the uncoated region of at least one first electrode;
   at least one of the separators; and
   at least one coated region adjacent to the uncoated region of at least one second electrode.

5. The rechargeable battery of claim 3,
   wherein the spacing portion is at a side of the electrode assembly that is opposite to the side having the fixing portion.

6. The rechargeable battery of claim 1,
   wherein a space of the spacing portion is wider than 1/4 of the case thickness and narrower than the case thickness.

7. The rechargeable battery of claim 1, wherein the case comprises:
   a first covering portion located at a first side of the electrode assembly;
   a second covering portion located at a second side opposite to the first side of the electrode assembly, the first and second covering portions defining the spacing portion; and
   a gasket sealing a gap between the first and second covering portions, allowing first and second electrode tabs to protrude, and defining one side of the marginal region.

8. The rechargeable battery of claim 7,
   wherein a first curved surface protrudes from the first covering portion toward the second covering portion; and
   wherein a second curved surface protrudes from the second covering portion toward the first curved surface.

9. The rechargeable battery of claim 8, wherein the gasket comprises:
   a first curved groove corresponding to the first curved surface of the first covering portion; and
   a second curved groove corresponding to the second curved surface of the second covering portion.

10. The rechargeable battery of claim 7,
    wherein the first covering portion has a flat surface; and
    wherein the second covering portion has a curved surface protruding toward the flat surface.

11. The rechargeable battery of claim 10,
    wherein the space of the spacing portion is minimized at a location that is at half a length of the marginal region.

12. The rechargeable battery of claim 11,
    wherein the space of the spacing portion is set to 1/4 of the case thickness at a location that is at half a length of the marginal region.

* * * * *